(12) United States Patent
Baker-Campbell et al.

(10) Patent No.: US 10,983,092 B2
(45) Date of Patent: Apr. 20, 2021

(54) ACOUSTIC SENSOR

(71) Applicant: The Technology Partnership Plc, Royston (GB)

(72) Inventors: Andrew Baker-Campbell, Royston (GB); Justin Buckland, Royston (GB); Harry Bullivant, Royston (GB)

(73) Assignee: The Technology Partnership Plc

( * ) Notice: Subject to any disclaimer, the term of this patent is extended or adjusted under 35 U.S.C. 154(b) by 398 days.

(21) Appl. No.: 15/534,916

(22) PCT Filed: Dec. 11, 2015

(86) PCT No.: PCT/GB2015/053869
§ 371 (c)(1),
(2) Date: Jun. 9, 2017

(87) PCT Pub. No.: WO2016/092324
PCT Pub. Date: Jun. 16, 2016

(65) Prior Publication Data
US 2017/0336362 A1    Nov. 23, 2017

(30) Foreign Application Priority Data
Dec. 11, 2014    (GB) ..................................... 1422012

(51) Int. Cl.
*G01N 29/02* (2006.01)
*G01N 29/22* (2006.01)
*G01N 9/22* (2006.01)

(52) U.S. Cl.
CPC ........... *G01N 29/02* (2013.01); *G01N 29/222* (2013.01); *G01N 2291/021* (2013.01); *G01N 2291/022* (2013.01)

(58) Field of Classification Search
CPC ............................ G01N 29/02; G01N 29/222
USPC ......................................................... 73/24.06
See application file for complete search history.

(56) References Cited

U.S. PATENT DOCUMENTS 3,745,384 A * 7/1973 Blanchard ............. G01L 9/0016
310/324
2009/0283844 A1 * 11/2009 Sparks ................ B81C 1/00119
257/414

FOREIGN PATENT DOCUMENTS

EP         0813060 A2    12/1997
WO      2013083978 A1    6/2013

* cited by examiner

*Primary Examiner* — John Fitzgerald
*Assistant Examiner* — Rodney T Frank
(74) *Attorney, Agent, or Firm* — Lerner, David, Littenberg, Krumholz & Mentlik, LLP

(57) ABSTRACT

An acoustic sensor comprises a side wall closed at each end by an end wall to form a cavity which, in use, contains a fluid. At least one transmitter and at least one receiver are operatively associated with one of the end walls. A maximum half width, a, of the cavity and a height, h, of the cavity satisfies the following inequality: a/h is greater than 1.2. In use, the transmitter causes oscillatory motion of the region of the end wall operatively associated with the transmitter, in a direction substantially perpendicular to the plane of the end walls such that the perpendicular oscillations of the end walls drive substantially in-plane oscillations of the fluid pressure in the cavity. The substantially in-plane oscillations in the pressure of the fluid drive substantially perpendicular oscillatory motion of the region of the end wall operatively associated with the receiver, resulting in an electrical signal from the receiver.

20 Claims, 8 Drawing Sheets i=0, j=0 i=0, j=1 i=0, j=2 i=1, j=0 i=1, j=1 i=1, j=2 i=2 j=0 i=2, j=1 i=2, j=2

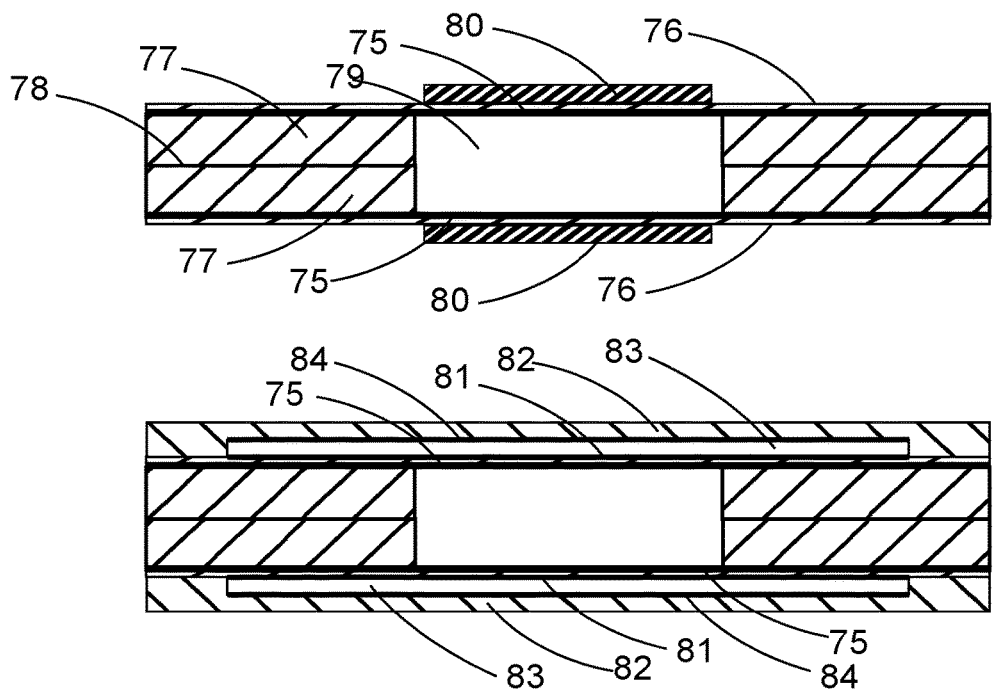
FIG. 8A
FIG. 8B
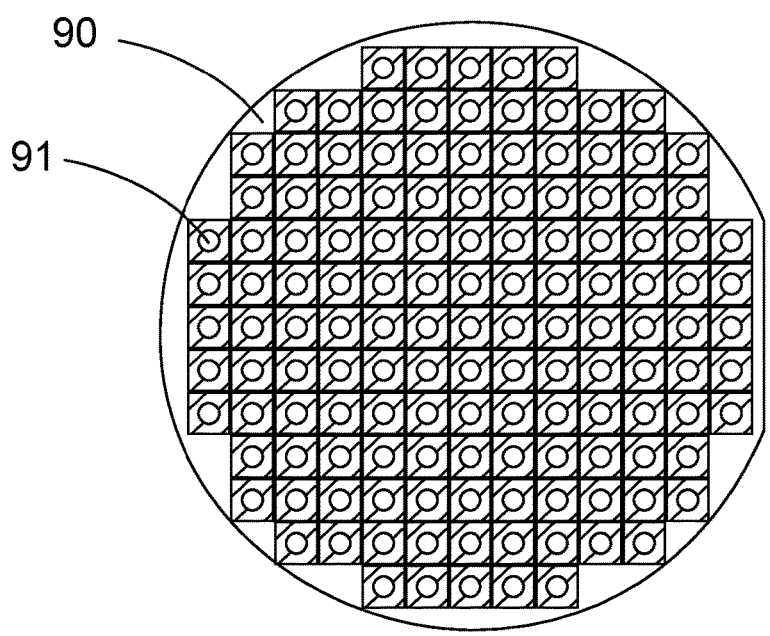
FIG. 9

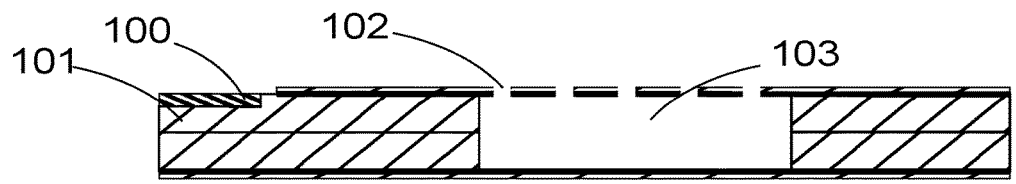
FIG. 10A
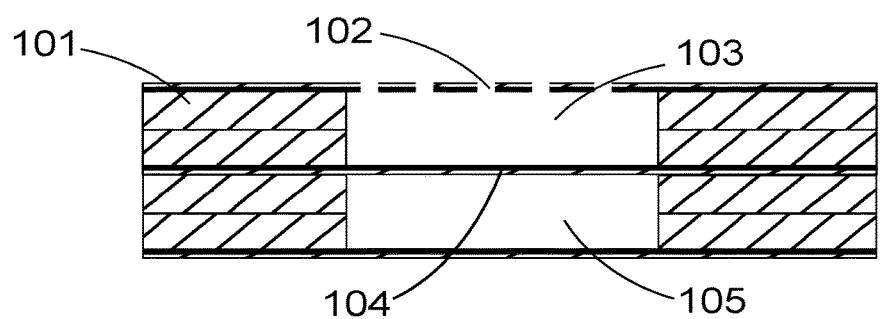
FIG. 10B
FIG. 11A
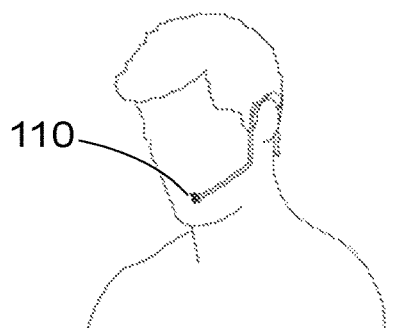
FIG. 11B
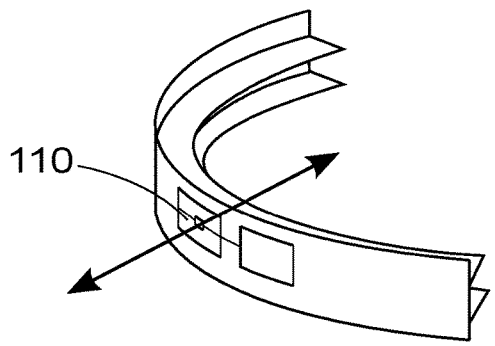
FIG. 11C
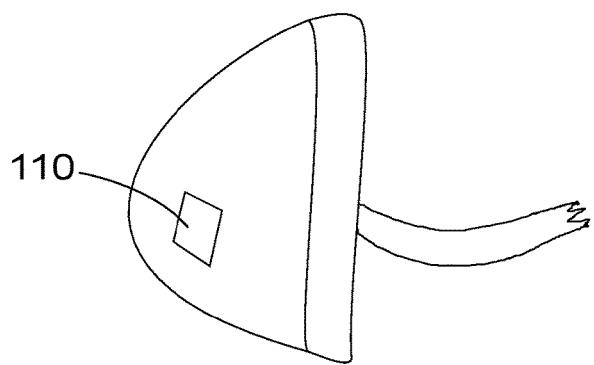

ACOUSTIC SENSOR

CROSS REFERENCE TO RELATED APPLICATIONS

The present application is a national phase entry under 35 U.S.C. § 371 of International Application No. PCT/GB2015/053869, filed Dec. 11, 2015, which claims priority from GB 1422012.3 filed Dec. 11, 2014, all of which are incorporated herein by reference.

This invention relates to a sensor for the measurement of the properties of gases within a disc shaped acoustic cavity.

Devices which determine the composition of a gas mixture by measuring the speed of sound in that mixture are well known. The two most prevalent acoustic techniques are the time-of-flight technique and the resonant cavity technique. The drawbacks and limitations of each type of device have been described in EP 0813060.

WO2013/083978 relates to the design of a resonant acoustic sensor where the transmitter (which is driven) and the receiver (which is passive) are operatively associated with opposing end walls of a disc-shaped cavity. As a result of this geometry, in operation both the mechanical stiffness of the transmitter and the receiver of such a device are well matched to the acoustic impedance of the disc shaped volume of fluid in the cavity. This disc-shaped geometry is also preferable for achieving good spatial matching between the displacement profiles of the transmitter and receiver and the in-plane, preferably radial, fluid pressure oscillation in the cavity. The combination of these properties enables efficient generation of pressure oscillations by the transmitter and efficient generation of an electrical output signal from the receiver.

It is often economical to manufacture small electromechanical devices, such as the sensor described in WO2013/083978, using a batch process where a number of devices are fabricated at the same time from common layers of material. The devices are then singulated from the conjoined batch late in the manufacturing process. This approach enables production steps to be carried out on many devices in parallel, reducing manufacturing time and avoiding problems associated with the handling of small parts. Simplistically, the complexity and cost of a device can be minimized by limiting the number of wafers used in a device.

The batch process described above is common in the manufacture of microelectromechanical systems (MEMS) where the layers can be referred to as wafers. The small size typical of MEMS may be desirable for a gas sensor to reduce the time for gas to diffuse into the sensor cavity and thereby reduce the sensor response time, so manufacturing in a batch process can provide both economic and performance benefits.

The sensor disclosed in WO2013/083978 comprises a transmitter and receiver on opposing end walls. While the transmitter and receiver can comprise of the same types of material, because they are not coplanar they cannot be formed from common layers of material. Furthermore, the transmitter and receiver require typically connection to an electrical circuit. Positioning the transmitter and receiver on opposing end walls complicates this electrical connection. Accordingly, there is a need to provide a sensor with the high performance characteristics of the type disclosed in the sensor of WO2013/083978, but which can be manufactured at a lower cost and is of simpler construction.

According to the present invention there is provided an acoustic sensor comprising: a side wall closed at each end by an end wall to form a cavity which, in use, contains a fluid; at least one transmitter and at least one receiver operatively associated with one of the end walls; wherein a maximum half width, a, of the cavity and a height, h, of the cavity satisfies the following inequality:

$$\frac{a}{h}$$

is greater than 1.2; and wherein, in use, the transmitter causes oscillatory motion of the region of the end wall operatively associated with the transmitter, in a direction substantially perpendicular to the plane of the end walls; such that the perpendicular oscillations of the end wall drive substantially in-plane oscillations of the fluid pressure in the cavity; and the substantially in-plane oscillations in the pressure of the fluid drive substantially perpendicular oscillatory motion of the region of the end wall operatively associated with the receiver, resulting in an electrical signal from the receiver.

With the present invention, by providing the transmitter and receiver on a single one of the end walls of the sensor it is possible to reduce the manufacturing steps involved in constructing the sensor and also to simplify the electrical connections thereto. This results in a sensor which can be produced more cost effectively.

In use, the transmitter causes oscillations of the fluid pressure in the cavity in the plane of the end wall, which in turn causes the receiver to generate an oscillatory electrical signal. By comparing the signal used to drive the transmitter to the signal generated by the receiver, properties of the fluid in the acoustic cavity can be determined.

Examples of the present invention will now be described with reference to the accompanying drawing, in which:

FIG. 8 shows aspects of examples of an acoustic sensor with piezoelectric and electrostatic transducers.

FIG. 9 shows an example of a fabrication process where many MEMS gas measurement systems share a common wafer.

FIG. 10 shows aspects of examples of MEMS gas sensors with means of measuring temperature.

FIG. 11 shows embodiments of respiratory monitoring systems.

In the following detailed description of several illustrative embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1A:
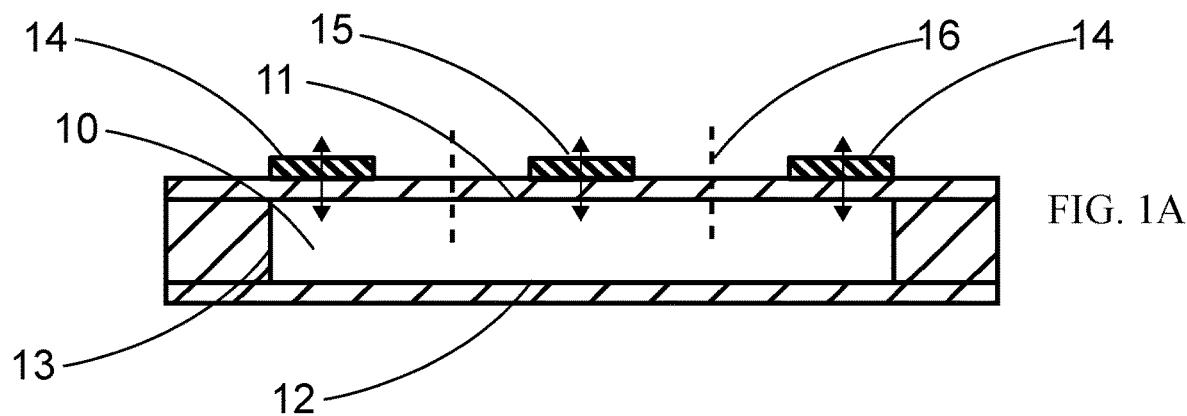
FIG. 1A is a side cross-sectional view of a sensor according to the present invention.

FIG. 1A is a cross-sectional view through a diameter of an example of an acoustic sensor according to the present invention. A cavity 10 is defined by end walls 11 and 12, and a side wall 13. The cavity 10 is shown in the figures as having circular cross-section in the plane of the end walls 11, 12. While this example has a cavity with a circular cross-section, it will be apparent to one skilled in the art that other shapes can be used. Substantially circular cross-sectional shapes provide advantages in favorable matching between the displacement of the end wall to the mode shape of the fluid in the cavity at resonance as discussed in WO2013/083978. Similar shapes including, but not limited to, a cavity with a cross-section in the shape of an ellipse, hypoellipse or hyperellipse share many of these benefits. Examples of an acoustic sensor having a cavity with a square cross section have advantages in the simplicity of manufacture using some processes including wafer dicing; however, there are a greater number of resonant acoustic modes present in these cavities, which can reduce the efficacy of the sensor.

In embodiment of FIG. 1A, the transmitter 14 and receiver 15 each comprise a piezoelectric transducer attached to the end wall 11. In this embodiment, the transmitter 14 is a ring shape which is concentric with the disc shaped receiver 15. The transmitter 14 and receiver 15 are mechanically isolated from one another, as represented by the dashed lines 16. It will be appreciated that transmitter 14 and receiver 15 are not limited to disc or ring shapes. Furthermore, each may comprise a plurality of elements in a compound transducer. While FIG. 1 has piezoelectric elements for the transmitter 14 & receiver 15, any transducer capable of converting electrical energy to motion and motion to electrical energy may be used. Many such transducer types, for example, magnetic or electrostatic transducers, are known in the art.

When an appropriate electrical drive is applied, the transmitter 14 is caused to vibrate in a direction substantially perpendicular to the plane of the cavity 10 (as marked by arrows). The position of the transmitter 14 significantly overlaps with an antinode (a region where maximum amplitude is observed) of a radial mode of acoustic resonance of the fluid in the cavity.

When the cavity radius a is greater than 1.2 times the height h of the cavity, i.e.

$$\frac{a}{h} > 1.2,$$

the lowest frequency radial mode of oscillation of the fluid in the cavity has a lower frequency than any longitudinal modes of the cavity. This limit can be applied more broadly to cavities with a non-circular cross-section by defining a as the maximum half width, which is equivalent to the radius in the case of a circle.

The above expression places an upper limit on cavity height, the lower limit is defined by acoustic loss in the resonant cavity. To avoid inefficient operation resultant from high viscous losses in the fluid in the cavity, the height of the cavity should be at least twice the thickness of the viscous boundary layer in the fluid:

$$h > 2\sqrt{\frac{2\mu a}{\rho k_0 c}} \; ; k_0 \approx 3.83.$$

Where $\mu$ is the viscosity of the fluid, $\rho$ is the density of the fluid, c is the speed of sound in the fluid and $k_0$ is the first root of the derivative of the first order Bessel function of the first kind which describes the shape of the lowest frequency radial mode pressure oscillation and is constant. Rearranging the above expression and substituting in standard values for density and viscosity;

$$\frac{h^2}{a}$$

should be greater than $1 \times 10^{-7}$ m when the fluid in the cavity is a gas and greater than $4 \times 10^{-10}$ m when the fluid in the cavity is a liquid. It will be appreciated by one skilled in the art that there is a similar limit resulting from the thermal boundary layer in the fluid.

Figure 1B:
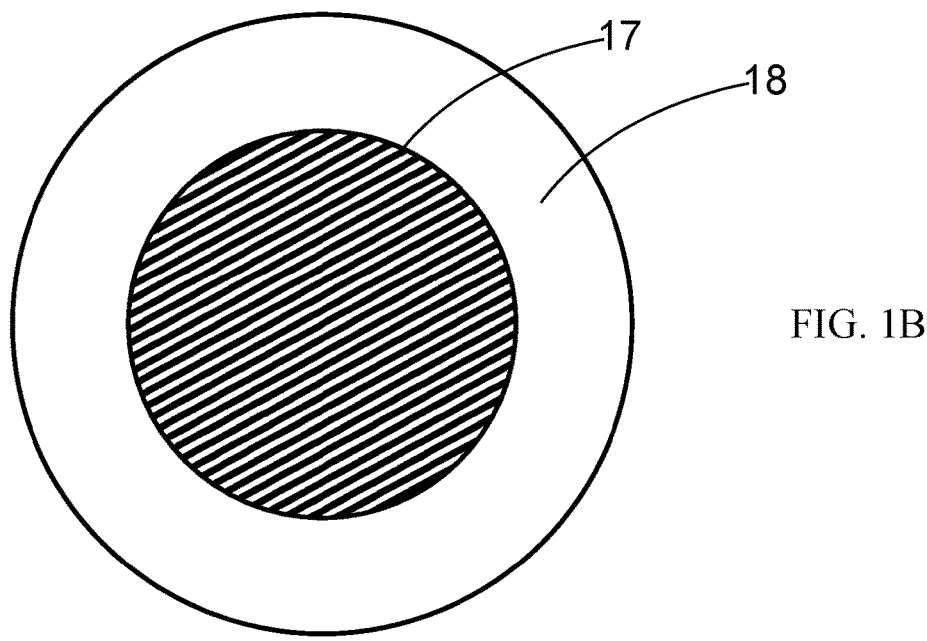
FIG. 1B is a plan view of a regular acoustic mode in the device of FIG. 1A.
Figure 1C:
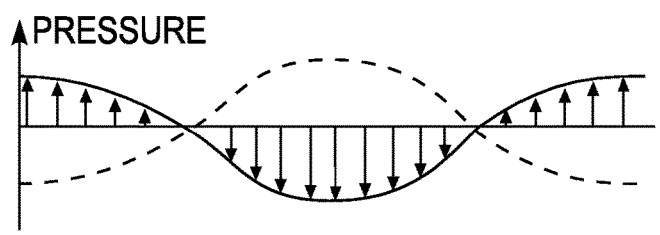
FIG. 1C shows pressure oscillation in the cavity of the device of FIG. 1A.

FIG. 1B is a plan view of this radial acoustic mode in the same cavity 10. Here the shaded region 17 and the unshaded region 18 represent opposite phases of pressure. The motion of the transmitter 14 generates a resonant oscillation in the fluid in the cavity 10. The pressure of the cavity along a diameter of the cavity when the fluid is oscillating in this mode is shown in FIG. 1C. The solid curved line and arrows indicate the pressure at one point in time, and the dashed curved line the pressure one half-cycle later. The radial dependence of this pressure oscillation p(r) approximates the form of the Bessel function:

$$p(r) = p_0 J_0\left(\frac{k_0 r}{a}\right); k_0 \approx 3.83.$$

Where $p_0$ is the maximum amplitude of the pressure oscillation, $J_0$ is the first order Bessel function of the first kind, $k_0$ is the first root of the derivative of that function, r is the radial position in the cavity and a is the radius of the cavity.

The position of the receiver 15 significantly overlaps with a second antinode of the radial mode of acoustic resonance of the fluid in the cavity. In the embodiment disclosed in FIG. 1, the position of the transmitter 14 and receiver 15 are interchangeable. The pressure oscillation in the cavity shown in FIG. 1C drives a displacement of the receiver 15. Displacement of the receiver causes an electrical signal to be generated. By comparison of the signal used to drive the transmitter and the signal generated by the receiver, properties of the fluid in the acoustic cavity can be determined such as the composition of a binary mixture of gases, temperature of a known fluid, density of a fluid or viscosity a fluid.

The acoustic sensor disclosed here can be used to measure the speed of sound in a fluid or a mixture of fluids. The resonant frequency of pressure oscillation shown in FIG. 10 is described by the expression:

$$f_0 = \frac{k_0 c}{2\pi a}; k_0 \approx 3.83.$$

Where $k_0$ is the first root of the derivative of the first order Bessel function of the first kind, c is the speed of sound in the cavity and a is the radius of the cavity. The resonant frequency of the pressure oscillation can be determined by observing the frequency at which the electrical amplitude gain or electrical power gain between the transmitter and the receiver is maximised. One way to do this is to sweep the frequency of the electrical driving signal to the transmitter, recording the gain at each frequency. Similarly, the resonant frequency can be determined by comparing the phase of the input signal of the transmitter to the output signal of the receiver. This can be done by sweeping the frequency of the drive signal and recording the frequency at which the phase difference between the transmitter drive waveform and the receiver signal waveform has a particular constant value.

Figure 2:
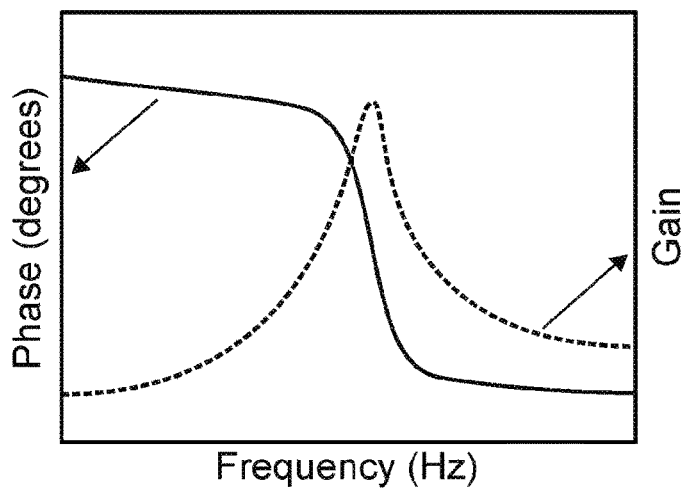
FIG. 2 shows phase and gain characteristics for the sensor of FIG. 1A with respect to frequency.

FIG. 2 shows both the phase difference between transmitter drive waveform and receiver signal waveform and the electrical gain for an example of the sensor described herein. One application enabled by accurate measurement of the speed of sound of a fluid is the determination of the composition of a binary mixture of gases. The equations to relate the composition of a binary gas to the speed of sound of a fluid are well known and are summarised in the patent EP 0813060.

FIG. 3 shows two examples of the invention with different means of mechanically isolating the transmitter and the receiver. It is desirable that motion should pass from the transmitter, through the fluid in the cavity and into the receiver—this represents the 'signal' of the sensor. It is undesirable that motion should pass from the transmitter to the receiver by any other means—this motion will produce an electrical response which interferes with the desired signal of the sensor. The signal to noise ratio is a key figure of merit for a sensor. By mechanically isolating the transmitter from the receiver the noise can be reduced.

Figure 3A:
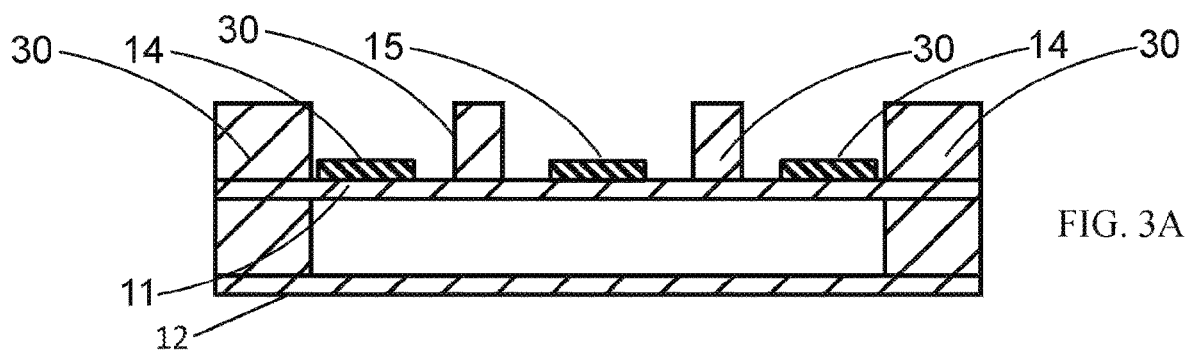
FIGS. 3A to 3C are side cross-sectional views of further example sensors according to the present invention.
Figure 3B:
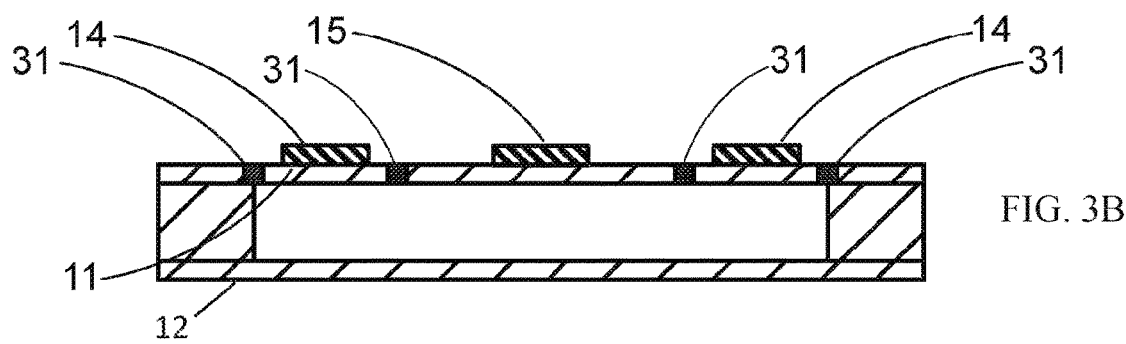
Figure 3C:
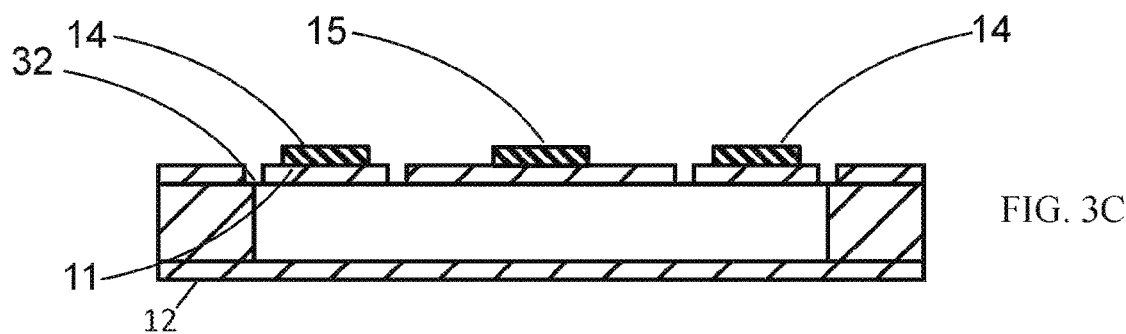

FIG. 3A is a cross-sectional view through a diameter of an example of the acoustic sensor which has rigid supporting structures 30 that locally prevent motion of the end wall 11, isolating the transmitter 14 from the receiver 15. FIG. 3B is a cross-sectional view through a diameter of an example of the acoustic sensor which has flexible sections 31 of the end wall 11 that reduce the transmission of motion through the end wall 11, isolating the transmitter 14 from the receiver 15. FIG. 3C is a cross-sectional view through a diameter of an embodiment of the acoustic sensor which has a thin, flexible membrane 32 bridging gaps in the end wall 11, isolating the transmitter 14 from the receiver 15.

Figure 4A:
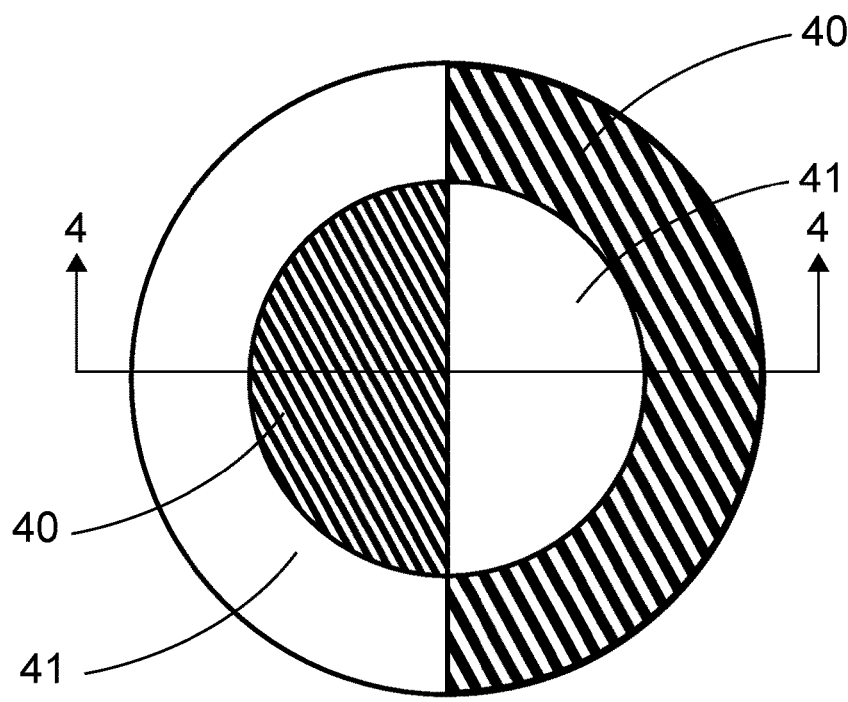
FIGS. 4A to 4D show a higher order radial acoustic mode and cross-sectional views of an acoustic sensor employing such a higher order radial acoustic mode.

A fluid-filled, disc-shaped cavity can support a plurality of radial acoustic modes. This invention enables the acoustic sensors which make use of these so called 'higher order' modes. FIG. 4 shows an example. FIG. 4A is a plan view of a higher order radial acoustic mode in a disc shaped cavity of an acoustic sensor. Here, the shaded region 40 and the unshaded region 41 represent opposite phases of pressure.

Figure 4B:
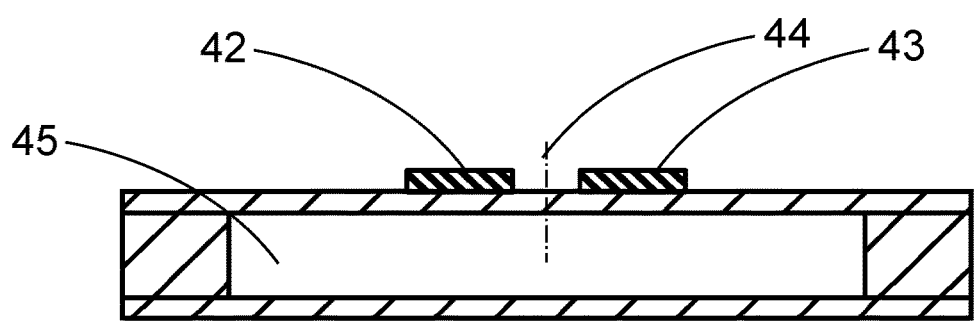
Figure 4C:
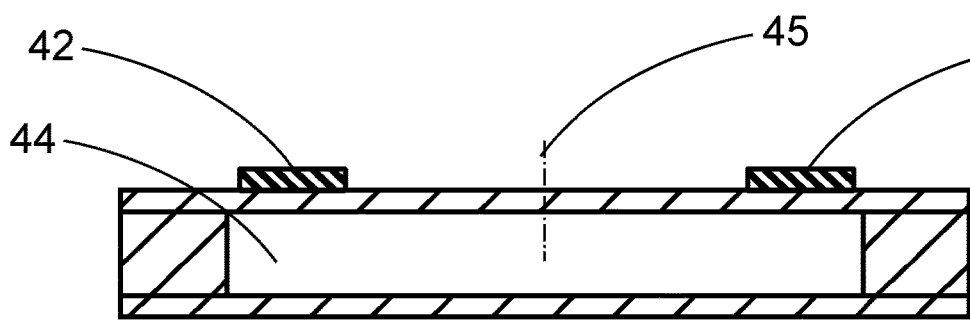
Figure 4D:
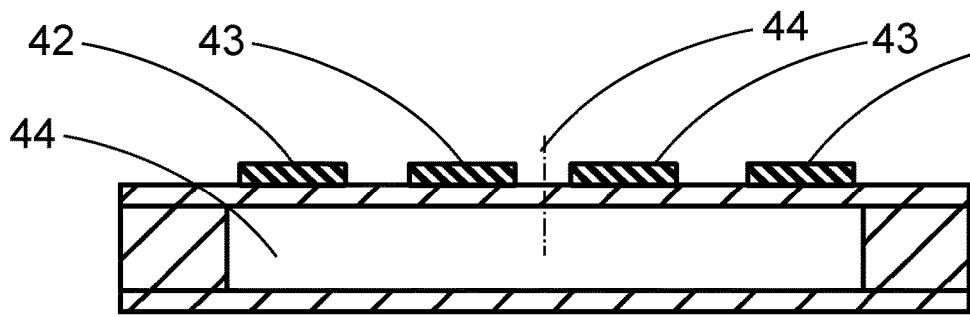

FIG. 4B is a cross-sectional view of the acoustic sensor of FIG. 4A, taken along line 4-4. The positions of the transmitter 42 and the receiver 43 correspond to antinodes of the acoustic mode of the cavity 44. Again, the positions of the transmitter 42 and the receiver 43 are interchangeable and they are mechanically isolated from one another 45. FIG. 4C is a cross-sectional view of the acoustic sensor of FIG. 4A, taken along line 4-4, with alternative transmitter and receiver positions. Here the transmitter 42 and receiver 43 are positioned to correspond with the outer antinodes of the acoustic mode shown in FIG. 4A. FIG. 4C is a cross-sectional view of the acoustic sensor of FIG. 4A, taken along line 4-4, with one transmitter 42 and three receivers 43 referred to collectively as transducers. The positions of the transducers all correspond to antinodes of the acoustic mode shown in FIG. 4A. Provided that one or more of the transducers operates as a transmitter and one or more of the transducers operates as a receiver, their function and positions are interchangeable.

Figure 5:
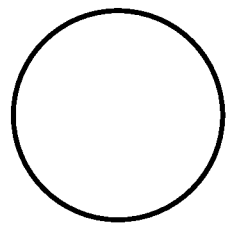
FIG. 5 shows a number of alternative higher order radial acoustic modes that could be employed in sensors in accordance with the present invention.
Figure 5:
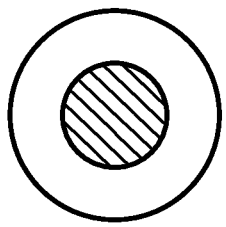
Figure 5:
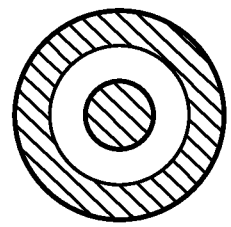
Figure 5:
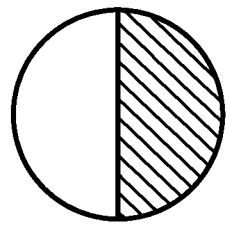
Figure 5:
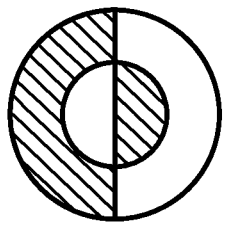
Figure 5:
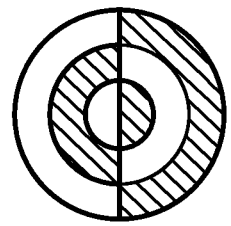
Figure 5:
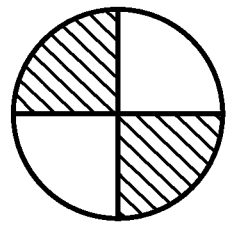
Figure 5:
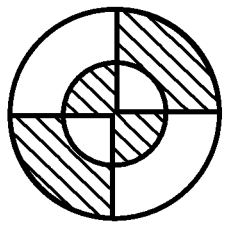
Figure 5:
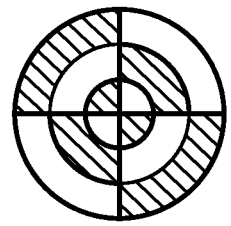

FIG. 5 shows a number of further alternative higher order radial acoustic modes that could be employed by a sensor according to the present invention and it will be appreciated by a person skilled in the art where transducers can be located to take advantage of such these modes.

As will be appreciated from the above description, the present invention provides a series of example acoustic sensors which can provide highly accurate readings and high levels of functionality and reliability yet which are simple to design and manufacture at relatively low cost.

There are further benefits to forming the features described above on a millimetre or sub millimetre length scale including lower power consumption and a volume and mass compatible with a wider range of portable applications. An unexpected benefit of operating on this length scale is that the response time of the sensor can be significantly improved.

The response time of a gas measurement system of the type described herein to changes in the composition of the gas surrounding it is affected by the rate of diffusion between the gas in the cavity and the surrounding gas. Various parameters affect the diffusion rate including the size of the cavity; the number and deposition of openings into the cavity; and the size of the openings relative to the size of the cavity.

A cavity capable of supporting a high quality factor acoustic resonance is desirable for embodiments described above where the frequency of the resonance is used to determine the speed of sound of the gas in the cavity. A high quality factor allows for more accurate determination of the speed of sound. Increasing the size of the openings in the cavity relative to the size of the cavity or the number or openings in the cavity reduces this quality factor so is undesirable. However, for a given size of opening relative to the cavity size and number of openings, reducing the size of the cavity increases this diffusion rate.

Figure 6:
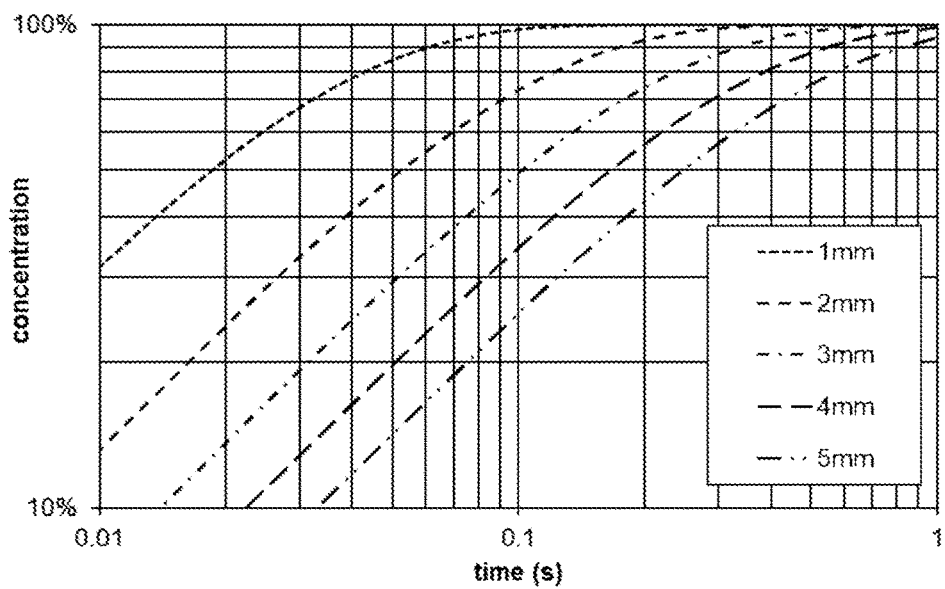
FIG. 6 shows the relationship between diffusion rate and cavity size for an embodiment of an acoustic sensor.

FIG. 6 shows a graph which depicts the relationship between cavity radius and diffusion rate. The data shown are the results of a computational model from commercially available finite element analysis software. The model begins with a disc shaped cavity, similar in geometry to that shown in FIG. 1, with a plurality of openings initially filled with air, surrounded by a much larger volume initially filled with carbon dioxide. The horizontal axis of FIG. 6 shows time, the vertical axis shows the average concentration of carbon dioxide in the cavity. The slopes of the curves show that as time passes diffusion occurs, and the concentration of carbon dioxide in the cavity increases.

Each curve in FIG. 6 represents a different cavity radius. All other geometric parameters are scaled relative to the cavity radius. The concentration changes more quickly for cavities with a smaller radius. Response time of a gas measurement system is often described by a T90 value, the time taken for the system to register 90% of the change in gas concentration which is applied. For many potential applications, a T90 of less than 1 s is required. With reference to FIG. 4, a preferred embodiment of the gas measurement system will have a cavity radius of less than 5 mm. Further potential application, such as respiratory monitoring, require a T90 of less than or equal to 100 ms. Embodiments with a cavity diameter of less than 2 mm are advantageous for such applications.

FIG. 7 shows aspects of an example acoustic sensor also according to the invention fabricated using a MEMS process. To enable practical fabrication on a millimetre and sub-millimetre length scale, the sidewall, endwalls, transmitter and receiver of the MEMS gas measurement system comprise a stack of thin layers of differing materials. This structure is compatible with microelectromechanical systems (MEMS) fabrication methods, which enables practical manufacture.

MEMS processes involve the construction of 3D structures on a micrometre scale. Whilst there is overlap with established semiconductor manufacturing processes, MEMS is differentiated by the manufacture of structures which have the capacity for mechanical deformation. A range of MEMS processing techniques exist, all of which are typically applied to planar, disc-shaped wafers of material. Processes include Deep Reactive Ion Etching (DRIE), Silicon etching, laser processing and Lithographie, Galvanoformung, Abformung (LIGA). MEMS technologies are used to produce a wide range of sensors, including accelerometers, gyroscopes, magnetometers and microphones.

MEMS processes are well suited to the manufacture of 3D structures similar to the geometries used in the resonant acoustic sensors described here. For example, both LIGA and DRIE can produce near-vertical walls in wafers up to 1 mm thick. The surface finish of these walls can be adjusted through the manipulation of process parameters, providing precise control of their mechanical properties. The overall outline of these etched structures is controlled by a preceding lithographic process, providing flexibility to produce a range of shapes including cylindrical chambers and more complex comb-like structures as used in inertial sensors.

3D structures are typically produced by assembling and selectively bonding multiple layers of material at a wafer-scale. These can be etched before or after their assembly, providing further flexibility over the final shape of assembled structures. The thickness of wafer layers can be precisely controlled through bulk grinding processes. In combination with nanometre-scale oxidation layers which are resistant to etching, the thickness of etched structures can be precisely controlled to match that of the bulk wafer. These oxidation layers can additionally be deposited on three dimensional structures to prevent material removal during subsequent etch processes.

The precision of MEMS processes enable sub millimetre structures to be produced with geometrical tolerances better than one micrometre. These features can be used to produce cavity structures such as those proposed here in dimensions which are not feasible with large-scale moulding or machining processes. Structures less than 5 mm in diameter are therefore well within the capability of MEMS processes.

A wide variety of materials are compatible with MEMS manufacturing processes. Silicon, polymers, metals and ceramics can be processed using the approaches described above, as well as having coatings applied to affect their electrical or processing properties. This material flexibility provides freedom to select and combine materials according to their desired electrical and mechanical behaviour—for example, their response to an acoustic resonance.

Figure 7A:
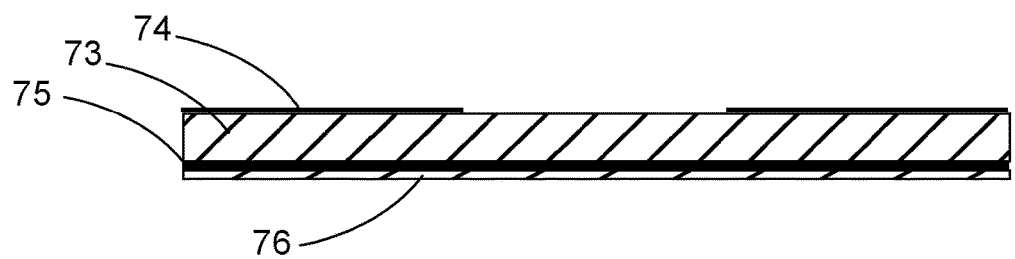
FIG. 7 shows aspects of an example of an acoustic sensor fabricated using a MEMS process.

FIG. 7A shows a stack of planar layers of material used in fabrication in the present invention. The upper surface of a first layer of a first material, 73, is selectively masked by a patterned layer of a second material, 74. The first layer is stacked on top of two other layers, the upper of which is of a different material to the first layer, 75, and the lower of which is of the same material, 76. In a preferred embodiment the first material is silicon, the second is a polymer and the third is an oxide.

Figure 7B:
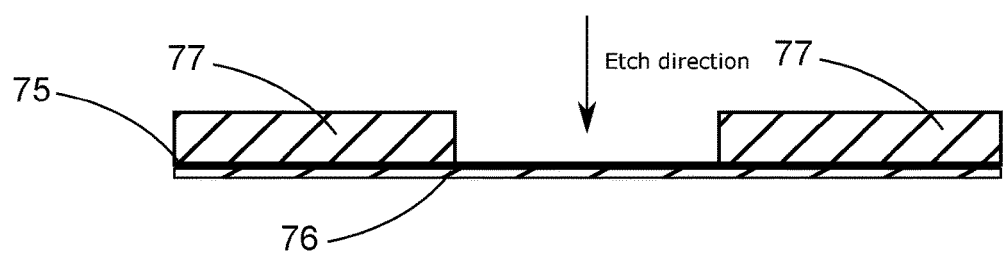

FIG. 7B shows the outcome of an etch process which has removed material from the unmasked areas of the first layer, leaving material which will form part of the side wall, 77. The layer below, 75, is substantially unaffected by the etch process. In a preferred embodiment a chemical is used in the etch process which is highly reactive to the first layer but non-reactive to the layer below. In a preferred embodiment the etchant comprises of chlorine plasma.

Figure 7C:
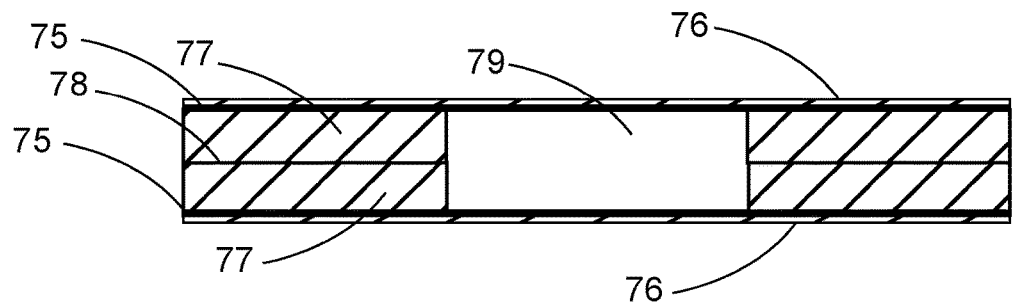

Several bonding processes are used in MEMS manufacture. These include eutectic bonding, diffusion bonding, anoding bonding and glass frit bonding. These can serve several purposes, for example in bonding two symmetrical chambers to produce a hollow, enclosed cavity. The selection of bonding techniques will be influenced by their mechanical properties and, where it is necessary to seal an enclosed cavity, their resistance to the diffusion of gasses contained within the cavity. FIG. 7C shows an example comprising of two of the structures shown in FIG. 7B, one inverted with respect to the other, bonded with a eutectic bond, 78, to form a cavity, 79.

Several techniques for mechanical actuation and transduction have been developed for MEMS devices. Many of these techniques are appropriate to the excitation and detection of an acoustic resonance. Techniques which could be considered for this application include piezoelectric, electrostatic and capacitive actuators.

FIG. 8 shows further acoustic sensors according to the invention with two different means of transduction. FIG. 8A describes an embodiment of an acoustic sensor with the same layered structure described in FIG. 7C, with the addition of a layer of a piezoelectric material, 80, bonded to the outer edges of the end walls. This construction can provide a so-called 'bending mode transducer' where an electric field generated across the thickness of the layer of the piezoelectric material causes a change in the dimension of the material in the plane of the end wall. Due to the bond with the end wall, this dimensional change results in a displacement of the end wall, 75, perpendicular to the plane of the end wall.

FIG. 8B shows a further acoustic sensor comprising the same layered structure described in FIG. 7C, with the addition of a conducting layer which is used as a first electrode, 81; an insulating or semiconducting structure formed from another planar etched layer, 82, which forms a gas filled or evacuated cavity, 83, above the first electrode; and a second conducting layer which forms a second electrode, 84. A potential difference is applied between the first and second conducting electrodes causing a displacement of the end wall, 75, in a direction perpendicular to the plane of the end wall.

It is common for MEMS devices to incorporate application specific integrated circuits (ASICs) onto the same silicon wafer substrate as larger MEMS structures. This provides several advantages including reduced overall size and potential for lower cost.

The power consumption of sensors according to the invention is affected by the mass of the transducer, which is again related to the geometric size of the device. A smaller transducer made of the same material will have less mass and therefore require less kinetic energy to move at a given velocity. Reduced power consumption is especially desirable for portable applications where the power source is a battery or means of energy harvesting.

One of the primary reasons MEMS devices can be manufactured cost effectively are that many devices can be manufactured from single wafer of material. The processes described above are thus applied to many devices in parallel (a batch) significantly reducing production time and cost.

FIG. 9 shows an embodiment of a manufacturing step where a single wafer of material, 90, is used in the fabrication of many sensors, 91.

The speed of sound of an ideal gas c is dependent on its temperature T as shown by the equation:

$$c = \sqrt{\frac{\gamma RT}{M}}$$

When calculating gas composition, it is therefore essential to accurately monitor the temperature of the gas under measurement. In an acoustic sensor, it may be advantageous to integrate a temperature sensor into the same component using MEMS or semiconductor manufacturing processes; this may be on a wafer of material which also forms the resonant acoustic cavity.

FIG. 10A shows aspects of a MEMS gas measurement system according to the invention where a temperature sensor 100 is deposed on the wafer 101 which forms the sidewall of the cavity of an acoustic sensor which has the same layered structure described in FIG. 7C. This embodiment has a plurality of openings, 102, to the cavity, 103, to allow diffusion of gases between the cavity, 103, and the surrounding environment.

Converse to the situation above, where the composition of a gas is known and fixed, the measurement of its speed of sound can be used to determine gas temperature. This can be achieved through the construction of a resonant acoustic cavity containing a reference gas of known composition. This could be used either as a stand-alone temperature measurement system or as a means of compensation for gas measurement system.

The integration of reference and measurement cavities can be achieved such that they are in intimate thermal contact and the temperature of a reference gas known to be equal to that of a measurement gas. For example, this could be achieved through the cavities sharing a common end wall. The small scale of MEMS devices provides an advantage in that it enables a low thermal mass of sensor which can rapidly reach thermal equilibrium with their surroundings.

FIG. 10B shows aspects of an embodiment of a MEMS gas measurement system formed using layers of material similar to those in FIG. 7 where a first acoustic cavity, 103, with a plurality of openings, 102, shares a common end wall, 104, with a sealed reference cavity containing a known gas, 105.

FIG. 11 shows examples of respiratory monitoring systems with the acoustic sensor mounted in the flow of respiratory gas. FIG. 11A shows the sensor on a boom 110 in proximity to a human patient's mouth. FIG. 11B shows the sensor 110 mounted on a mouth guard like structure. The arrow represents the flow of air in and out of the wearer's respiratory system. FIG. 11O shows the sensor 110 mounted on a face mask.

Monitoring of respiratory gases is used to provide information about pulmonary lung perfusion, alveolar ventilation, respiration patterns and rate, and CO2 production and elimination. Respiratory monitoring also provides indirect information on the performance of metabolism and circulation. The information provided by monitoring exhaled gases can be used to improve the outcomes of critically ill patients (human and animal) whose breathing is supported by ventilation and patients undergoing anaesthesia. Another important critical care application is assessing correct endotracheal tube placement. Further applications include athletic performance monitoring; monitoring of chronic respiratory conditions such as asthma and COPD; measurement of lung capacity; monitoring of patients with analgesics.

One of many applications for the acoustic sensor described herein is as a respiratory monitoring system. Many respiratory monitoring devices measure the change in gas properties throughout the breathing cycle (rather than measuring a single sample). To this end time resolution is important and a sensor response time of 100 ms of less is desirable. FIG. 6 shows that the cavity radius should be less than 2 mm to achieve a T90 of 100 ms.

Figure 12:
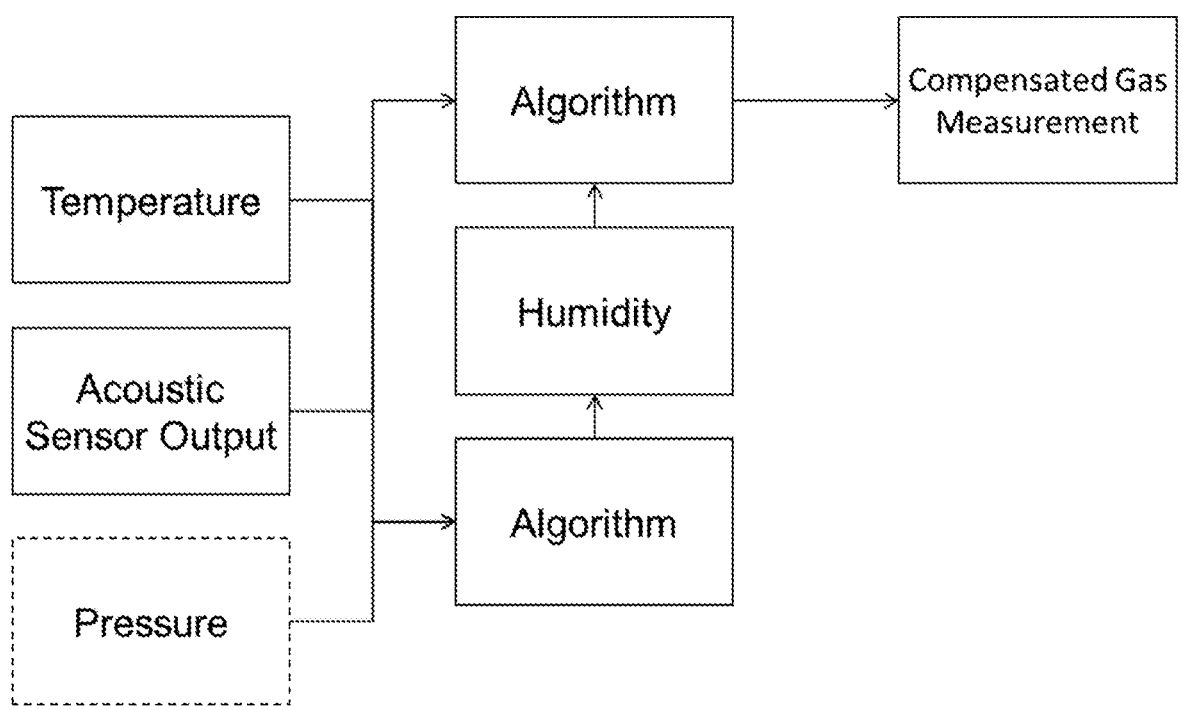
FIG. 12 shows a block diagram of an embodiment of a respiratory monitoring system with humidity compensation.

Water vapour in exhaled breath changes the gas properties. In a preferred embodiment of a respiratory monitoring system the output of the MEMS gas measurement system is compensated for the effects of water vapour. Typical low-cost water vapour sensors have a response time much slower than 100 ms. FIG. 12 shows a block diagram describing a more preferred embodiment of a respiratory monitoring system using an algorithm to estimate the water vapour content of exhaled gas through the breathing cycle.

The invention claimed is:

1. An acoustic sensor comprising:
   a side wall closed at each end by an end wall to form a cavity which, in use, contains a fluid;
   at least one transmitter and at least one receiver operatively associated with a first of the end walls, the at least one transmitter and the at least one receiver being mechanically isolated from one another by a rigid support structure positioned between the at least one transmitter and the at least one receiver, the rigid support structure locally preventing motion of the first end wall at locations where the rigid support structure contacts the first end wall;
   wherein a maximum half width, a, of the cavity and a height, h, of the cavity satisfies the following inequality:

$$\frac{a}{h}$$

is greater than 1.2; and
   wherein, in use, the transmitter causes oscillatory motion of the region of the first end wall operatively associated with the transmitter, in a direction substantially perpendicular to the plane of the end walls;
   such that the perpendicular oscillations of the end walls drive substantially in-plane oscillations of the fluid pressure in the cavity; and the substantially in-plane oscillations in the pressure of the fluid drive substantially perpendicular oscillatory motion of the region of the first end wall operatively associated with the receiver, resulting in an electrical signal from the receiver.

2. An acoustic sensor according to claim 1, wherein $$\frac{h^2}{a}$$

is greater than $4\times10^{-10}$ m.

3. An acoustic sensor according to claim 1, wherein the fluid in the cavity is a gas and wherein the ratio $$\frac{h^2}{a}$$

is greater than $1\times10{-7}$ m.

4. An acoustic sensor according to claim 1 where the position of the transmitter(s) and receiver(s) correspond to antinodes in a radial acoustic mode of the cavity.

5. An acoustic sensor according to claim 1 with a cavity which is of substantially circular cross-section.

6. An acoustic sensor according to claim 1 with a cavity which has an elliptical cross-section in the plane of the end walls.

7. An acoustic sensor according to claim 1 where the in-plane oscillations in the pressure of the fluid are radial pressure oscillations.

8. A MEMS gas measurement system comprising:
an acoustic sensor comprising:
a side wall closed at each end by an end wall to form a substantially cylindrical cavity which, in use, contains a fluid;
at least one transmitter and at least one receiver operatively associated with a first of the end walls, the at least one transmitter and the at least one receiver being mechanically isolated from one another by a rigid support structure positioned between the at least one transmitter and the at least one receiver, the rigid support structure locally preventing motion of the first end wall at locations where the rigid support structure contacts the first end wall;
wherein half of the largest width, a, of the cavity and a height, h, of the cavity satisfies the following inequality:

$$\frac{a}{h}$$

is greater than 1.2; and
wherein, in use, the transmitter causes oscillatory motion of the region of the first end wall operatively associated with the transmitter, in a direction substantially perpendicular to the plane of the end walls; such that the perpendicular oscillations of the end walls drive substantially in-plane oscillations of the fluid pressure in the cavity; and
the substantially in-plane oscillations in the pressure of the fluid drive perpendicular oscillatory motion of the region of the first end wall operatively associated with the receiver, resulting in an electrical signal from the receiver;
a drive circuit operatively connected to the transmitter configured to supply an oscillatory signal; and
a measurement circuit operatively connected to the receiver configured to provide a signal indicating the response of the sensor to changes in the gas within the cavity;
wherein the sidewall, endwalls, transmitter and receiver comprise one or more substantially planar layers of material of thickness <1 mm; and
wherein a is less than 5 mm.

9. A MEMS gas measurement system according to claim 8, wherein at least one planar layer is part of a wafer and that wafer is common to a plurality of acoustic devices during fabrication.

10. A MEMS gas measurement system according to claim 8, wherein the a is less than or equal to 2 mm.

11. A MEMS gas measurement system according to claim 8, wherein the sidewall and the end wall are formed of a material which is chemically reactive to an etchant and a material which is chemically inert to the same etchant.

12. A MEMS gas measurement system according to claim 8, wherein the sidewall and the end wall comprise a silicon layer and an oxide layer, respectively.

13. A MEMS gas measurement system according to claim 8, wherein the sidewall is composed of two layers of wafer material joined by a eutectic bond.

14. A MEMS gas measurement system according to claim 8, wherein the transmitter and/or receiver incorporates a layer of piezoelectric material.

15. A MEMS gas measurement system according to claim 8, wherein the transmitter and/or receiver incorporates a capacitive or electrostatic type transducer.

16. A MEMS gas measurement system according to claim 8, wherein the drive circuit and/or measurement circuit are integrated onto a layer common to the acoustic sensor.

17. A MEMS gas measurement system according to claim 8, wherein a means of temperature measurement is integrated onto a layer common to the acoustic sensor.

18. A MEMS gas measurement system according to claim 17, wherein the means of temperature measurement comprises a second acoustic sensor which responds to changes in temperature of a gas sealed within the cavity of the second acoustic sensor.

19. A MEMS gas measurement system according to claim 18, wherein the first and second acoustic sensors share a common end wall.

20. A MEMS gas measurement system according to claim 17, wherein a temperature sensor is used to compensate the output of the MEMS gas measurement system.

* * * * *